Figures 1, 2:
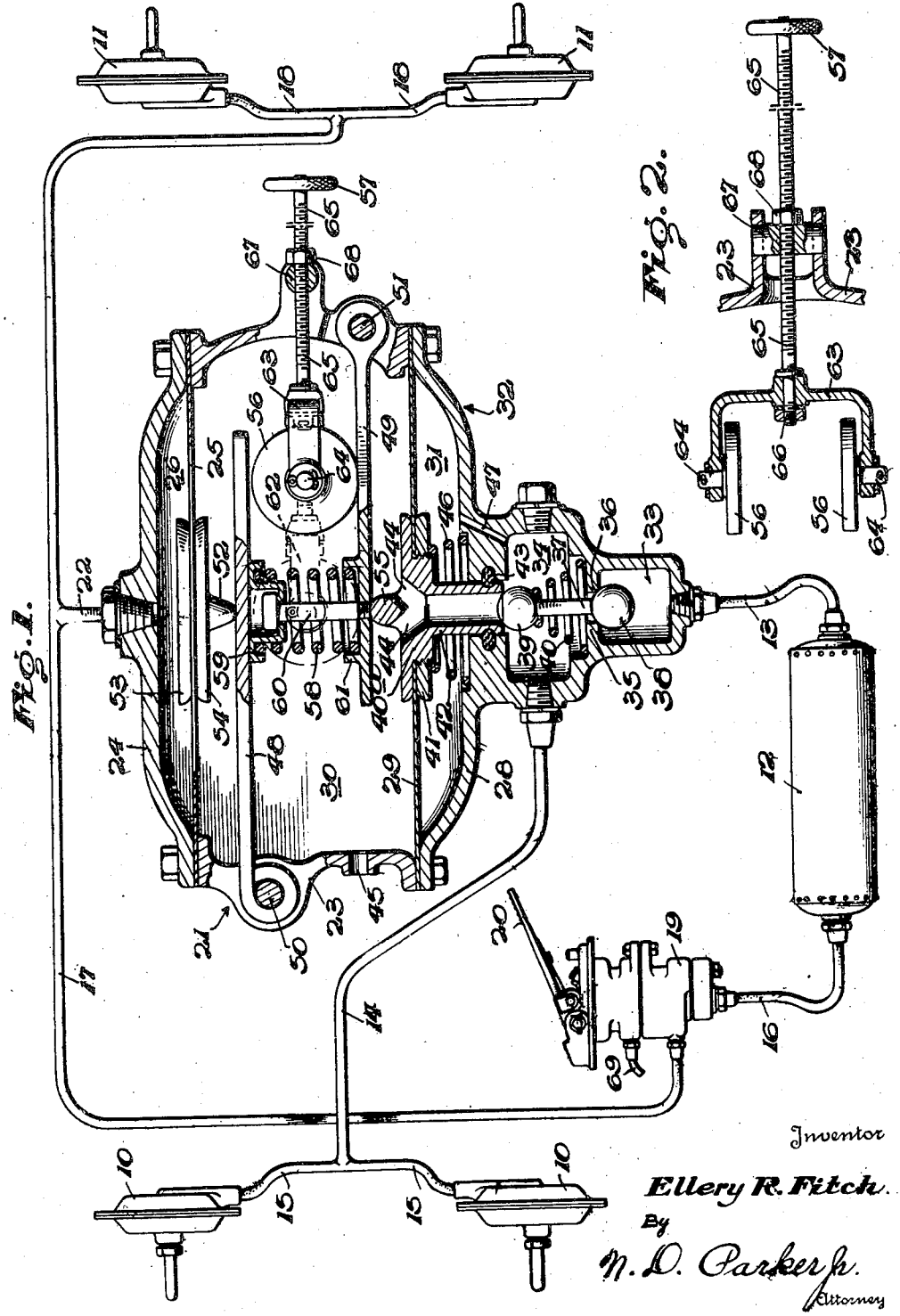

March 16, 1943. E. R. FITCH 2,313,991
BRAKE MECHANISM
Filed Feb. 12, 1941

Inventor
Ellery R. Fitch
By
N. D. Parker Jr.
Attorney

Patented Mar. 16, 1943

2,313,991

UNITED STATES PATENT OFFICE 2,313,991

BRAKE MECHANISM

Ellery R. Fitch, Pittsburgh, Pa., assignor to Bendix-Westinghouse Automotive Air Brake Company, Pittsburgh, Pa., a corporation of Delaware Application February 12, 1941, Serial No. 378,626

19 Claims. (Cl. 188—152)

This invention relates to fluid pressure apparatus and more particularly to a fluid pressure braking system adapted for use in connection with automotive vehicles.

One of the objects of the present invention is to provide, in a fluid pressure braking system having front and rear brakes, a novel arrangement whereby the braking effects at the front and rear wheels of the vehicle bear a predetermined ratio substantially throughout the range of braking pressures, the arrangement being such that the braking effect at the front wheels of the vehicle will be less than but proportional to the braking effect secured at the rear wheels of the vehicle, such a construction avoiding the possibilities of the front wheels becoming locked during braking of the vehicle.

Another object of the invention is to provide a novel fluid pressure apparatus in connection with a fluid braking system which is so constituted as to reduce the pressure of the fluid applied to the front brakes in such a manner that the pressure will be dependent upon the degree of pressure applied to the rear brakes.

It has been determined that, in the operation of fluid braking systems, a slight pressure is required for overcoming the frictional resistance and brake return springs of the system in order to bring the braking elements of the various brakes into light initial engagement. Moreover, in the operation of vehicles equipped with fluid pressure braking systems, a substantial amount of the brake applications occur under relatively low pressures, such as, for example, a momentary slowing up of the vehicle without actually bringing the same to a stop. In the systems which have heretofore been provided for attaining variable braking effects throughout the system in predetermined ratios, it has been found that, during many of the lighter braking applications, the degree of fluid pressure supplied to the front brake actuators is insufficient to overcome the aforementioned frictional resistance, and, hence, in such instances, the slowing down of the vehicle may be effected entirely by the operation of the rear brakes. This causes undue wear of the brakes and might even result in a tendency for the vehicle to skid.

It is, accordingly, a further object of the invention to provide a novel braking system which is so constructed as to avoid the above difficulties.

Another object comprehends the provision of an arrangement whereby the braking pressures at all wheels of the vehicle are substantially equal up to a point where a relatively light braking effect is attained at all wheels.

A further object is to provide, in a fluid pressure braking system of the foregoing character, a construction for automatically assuring a proportionate braking effect between the front and rear wheels of the vehicle after all of the brakes have been lightly applied.

A further object is to provide a novel braking apparatus of the above character that may be employed on tractor-trailer braking systems whereby a substantially equal degree of brake application may be obtained on the tractor and trailer during initial application of the tractor and trailer brakes, and so constructed that a differential or proportion between the degree of application of the tractor and trailer brakes may be automatically obtained when the pressure of the fluid applied to the system is above a predetermined value.

A still further object includes an arrangement whereby the operator may readily vary the ratio of braking effects either between the front and rear brakes of a single vehicle or between the brakes of leading and trailing vehicles of a vehicle train, such construction achieving the highly desirable result of distributing the braking effects throughout the system according to variations in loading of the vehicle or vehicles and also possible variable conditions of the pavement.

A still further object is to provide a novel arrangement of parts so constructed and arranged as to provide an unusually lightweight and compact structure, capable of ready inspection and repair and of such a nature that the same may be manufactured and installed upon existing fluid pressure braking systems at a relatively low cost.

Other objects and features of novelty of the invention will appear more clearly from the following detailed description taken in connection with the accompanying drawing, which illustrates one embodiment of the invention. It is to be expressly understood, however, that the drawing is for purposes of illustration only and is not designed as a definition of the limits of the invention, reference being had for this purpose to the appended claims.

One embodiment of the invention will be described in connection with the accompanying drawing, wherein similar reference characters refer to like parts throughout the several views and in which:

Fig. 1 illustrates a diagrammatic arrangement, partly in section, of a fluid pressure braking system adaptable for use in connection with automotive vehicles and embodying the present invention, and Fig. 2 illustrates, in greater detail, one of the features of the invention shown in Fig. 1.

Referring more particularly to Fig. 1, a fluid pressure braking system embodying the present invention is shown therein as including front and rear braking actuators 10 and 11, respectively, a fluid pressure reservoir 12, supplied with fluid pressure from any suitable means, not shown, conduits 13, 14 and 15 for supplying fluid under pressure to the front brake actuators, and conduits 16, 17 and 18 for supplying fluid under pressure to the rear brake actuators. A brake valve 19, constructed in any well known manner, preferably of the self-lapping type as disclosed in the patent to W. J. Andres and R. S. Sanford, No. 2,133,275, dated October 18, 1938, for Control mechanism, is positioned between conduits 16 and 17 for controlling the flow of fluid under pressure from the reservoir 12 to conduit 17. A manually operable control lever 20 is provided for operating the valve 19 in the above manner.

The main feature of the present invention resides in the automatic control of the braking pressures of the front and rear brake actuators. This control is effected in such a manner that, upon application of the brake valve 19, the degree of braking effects at the front and rear brake actuators are substantially equal up to a certain predetermined pressure admitted by the brake valve. Thereafter, the construction is such that the braking effect at the rear brake actuators will be greater than but proportional to the braking effect at the front brake actuators. This advantageous result is achieved by the utilization of a novel combined relay and differential valve 21 having a fluid pressure connection with the conduit 17 by means of conduit 22. The valve is, moreover, arranged between conduits 13 and 14 for controlling the pressure of the fluid supplied from reservoir 12 to the front brake actuators 10. More particularly, the combined relay and differential valve 21 comprises a cylindrical body portion 23 having a top portion 24 secured to the upper side thereof, by any suitable means. A diaphragm 25, the periphery of which is clamped between the portions 23 and 24, together with the portion 24, defines a chamber 26 which is in communication with the conduit 17 by means of the conduit 22. It will be understood that, upon actuation of the brake valve 19, fluid under pressure is supplied to the chamber 26 as well as the rear brake actuators 11 and the pressure exerted on the diaphragm 25 will be substantially equal to the pressure created in rear brake actuators 11. Body portion 23, together with a lower casing portion 28, suitably secured to the under side of the body portion 23, provide a housing for a valvular mechanism 32, of the self-lapping type, which is adapted to control a fluid pressure connection between the reservoir 12 and the front brake actuators 10, through conduits 13, 14 and 15. The valvular mechanism 32, as shown, includes a diaphragm 29 clamped between the portions 23 and 28, thereby defining chambers 30 and 31; and also includes chambers 33 and 34, defined by the walls of the portion 28 and a partition 35 formed integrally with the casing 28, having conduits 13 and 14 respectively communicating thereto. A port 36 is provided in the central portion of the partition 35, for allowing fluid pressure communication between chambers 33 and 34. A valvular member 37, positioned within the latter chambers, includes a pair of ball valve members 38 and 39 secured to the ends thereof; the former of which is adapted to normally close the communication between chambers 33 and 34 due to spring 40 which exerts a force between the upper side of the wall 35 and the ball valve 39. A valve actuating member 40a, rigidly secured to the diaphragm 29 by means of a threaded flange member 41, for example, is mounted for vertical movement within the portions 23 and 28. The valve actuating member 40a includes a downwardly extending hollow cylindrical member 42, resiliently mounted within the body portion 28 by means of an annular resilient member 43, which provides a fluid-tight seal between the body portion 28 and the cylindrical member 42. The lowermost end of the member 42 extends into the chamber 34 and is adapted to cooperate with the ball valve 39, during certain operating conditions of the valvular mechanism 32 explained more fully hereinafter, to close the normally open communication between the chamber 34 and an atmospheric port 45 in the body portion 23, such communication including the hollow cylindrical member 42, ports 44, the chamber 30 and the atmospheric port 45. A spring 46 is positioned between the valve actuating member 40a and the body portion 28 to hold the member 42 out of contact with the ball valve 39, as shown in the drawing, and thus normally venting the front brake actuators 10 to atmosphere through conduits 15 and 14, chamber 34, the hollow member 42, ports 44, chamber 30 and the atmospheric port 45. A restricted port 47, in the body portion 28, provides a communication between the chambers 34 and 31 whereby fluid under pressure in the chamber 34 may flow to chamber 31 and thereby provide the self-lapping feature of the valvular mechanism 32, which will be more fully explained hereinafter. The above discussed valvular mechanism 32, for controlling the flow of fluid under pressure to and from the front brake actuators, is operated by the downward force of the diaphragm 25 created by the pressure of the fluid applied in the chamber 26.

As discussed heretofore, means are provided by the present invention for applying fluid under substantially equal pressures at the front and rear brake actuators, thereby applying the front and rear brakes to an equal degree, upon initial operation of the brake valve 19, in such a manner as to allow the pressure of the fluid conducted to conduit 17 to be below a predetermined value; and also to provide means whereby a variable ratio may be automatically obtained between the degree of application of the front and rear vehicle brakes when the pressure of the fluid in conduit 17 is greater than the above mentioned predetermined value.

Such means, as shown in the drawing, comprise a pair of actuating levers 48 and 49, mounted on opposite sides of the body portion 23 for movement about pivot members 50 and 51 respectively. The lever 48 is adapted to contact an actuating member 52 secured to the diaphragm 25 by any suitable means, such as a pair of cooperating threaded flange members 53 and 54, secured together and clamping the diaphragm 25 therebetween, whereby the pressure exerted by the fluid in the chamber 26 is transmitted to the lever 48 and the latter tends to rotate in a clockwise direction about the pivot 50. The lever 49 contacts an upwardly extending portion 55 of the valve actuating member 48a, whereby counterclockwise movement of the lever 49 about the pivot 51 operates the valvular mechanism for supplying fluid under pressure to the front brake actuator.

In order to secure substantially equal degrees of braking effects at the front and rear brake actuators when the pressure of the fluid admitted to the system by the brake valve 19 is below a predetermined value, means are provided whereby a direct operative connection is maintained between the levers 48 and 49 only when the pressure of the fluid in the chamber 26 is below such predetermined value. Such operative connection includes a spring 58 positioned between the levers 48 and 49 and centrally aligned with the actuating member 52 and the actuated member 55. The lower end of the spring 58 is held on the outer end of the lever 49 by means of an annular flange 61, and the upper end thereof is enclosed by a cup 59, which has a sliding contact with the lower side of the lever 48. A stud 60 is utilized to maintain the cup 59 against the upper end of the spring 58, and, by threading the stud into the lever 49, in one direction or the other, the degree of precompression of the spring 58 may be varied. A mechanical connection is also provided between the levers 48 and 49 which is adapted to operate, when the pressure of the fluid admitted to the system through the brake valve is above the predetermined value, in order to maintain a differential between the actuating and actuated forces. In other words, when the pressure of the fluid in the system is of sufficient value to apply opposite forces on the levers 48 and 49, to overcome the precompression of the spring 58, the actuating force is then transmitted to the lever 49 through such mechanical connection. More particularly, the mechanical connection includes a pair of rollers 56, 56, adapted to rest on the upper side of the lever 49, and are of such diameter that, when the spring 58 is not deformed, a clearance will be present between the rollers 56, 56 and the lower side of the lever 48. Such clearance is provided for allowing the spring 58 to function as a connector between the levers 48 and 49 independently of the mechanical connection, represented by the rollers 56, 56, when the pressure of the fluid admitted to the system through the brake valve 19 is below a value sufficient to apply opposite forces on the levers 48 and 49 that will overcome the precompression of the spring 58. When the pressure of the fluid applied to the system is of such value that the opposite forces applied on the levers 48 and 49 will be of such value to overcome the precompression of the spring 58, the latter will be deformed. When the spring 58 is deformed a sufficient amount to bring the rollers 56, 56 into contact with the lever 48, the operative connection between the levers will then comprise the rollers 56, 56.

With regard to the functions of the operative connections between the levers 48 and 49, it is assumed that the spring 58 is precompressed to a value that corresponds to the predetermined pressure of the fluid applied to the system through the brake valve 19 which will result in the desired maximum equal braking effects on all wheels. When pressure, at or below such predetermined value, is admitted to the chamber 26, a force will be exerted upon the lever 48, through the actuating member 52. The spring 58, the lever 49 and the valve actuating member 40a will thus move downwardly to close the atmospheric connection with the conduit 14 and then open a fluid connection between conduits 13 and 14. Fluid in the chamber 34 will flow to the chamber 31, through the duct 47, and, when the pressure of the fluid in the chamber 34 applies a force on the lever 49, through the member 55, that is substantially equal to the force on the actuating member 52, due to the applied pressure, the spring 46 will move the valve actuating member 40a upwardly to close the fluid connection between the conduits 13 and 14, while maintaining the atmospheric connection with the conduit 14 closed. The valve mechanism 32 is then in the "lapped" position and the pressure of the fluid admitted to the front brake actuators 10 is substantially equal to the pressure of the fluid supplied to the rear brake actuator 11. When the pressure of the fluid supplied to the chamber 26 is above the predetermined value, the spring 58 will deform and allow the lever 48 to contact the rollers 56, 56. The operative connection between the levers 48 and 49 will, therefore, no longer be through the spring 58, but through the mechanical connection, represented by the rollers 56, 56. Since the mechanical connection produces a mechanical advantage which reduces the actuated force with respect to the actuating force, the pressure of the fluid in the chamber 31, necessary to bring the valve mechanism 32 to the "lapped" position, will be less than but proportional to the pressure of the fluid present in the chamber 26. Therefore, when the valve mechanism 32 is actuated through the mechanical connection, the pressure of the fluid supplied to the front brake actuators will be less than but proportional to the pressure of the fluid applied in the rear brake actuators 11.

As heretofore stated, one of the objects of the present invention is to provide means for manually varying the ratio between the degrees of brake application of the front and rear brakes. Such variations are accomplished by moving the rollers 56, 56 to the right or left from the position shown in the drawing. If the rollers 56, 56 are moved to the left, the proportion between rear and front braking effects would decrease, and, when the rollers 56, 56 reach a position shown in broken lines on the drawing, designated by the numeral 62, wherein the points of contact of the rollers 56, 56 are in line with the points of application of the forces, an equal ratio between the aforementioned forces will prevail, since a direct connection is then present between the point of application of the operating force and the point where such force acts upon the valve 32. When the rollers 56, 56 are in the latter position, a positive connection between the levers 48 and 49 is maintained, and, therefore, the operator may apply full reservoir pressure to the front brake actuators and thereby obtain a maximum application of all of the vehicle brakes. As the rollers 56, 56 are moved to the right as viewed in the drawing, the above mentioned proportion will increase, since the mechanical advantages of the arrangement of levers 48 and 49 decrease.

Means are provided for manually moving the rollers 56, 56 comprising, with reference more particularly to Fig. 2, a yoke member 63, having the rollers 56, 56 mounted for rotation on the ends thereof about the pivot members 64, 64, and a threaded stem 65, having one end thereof rotatably secured to the intermediate portion of the yoke 63 by any suitable means such as a nut 66. The other end of the stem 65 extends out-side the body portion 23 and has secured thereto a control member 57 whereby the stem may be rotated in one direction or the other. The above apparatus is pivotally mounted on the body portion 23 so that the rollers 56, 56 may follow upward or downward movements of the levers 48 and 49. As shown, the stem 65 is threaded through a pivot 67, the latter being mounted for rotation in the body portion 23. Hence, upon rotation of the control 57 in one direction or the other, the stem 65, yoke 63 and the rollers 56, 56 will move to the right or the left as viewed in the drawing. A lock nut 68 is provided for maintaining the stem 65 in any position of adjustment.

In operation of the embodiment of the invention heretofore described, fluid under pressure from the reservoir 12 is at all times supplied to the brake valve 19 by way of conduit 16 and also to chamber 33, of the valvular mechanism 32, through conduit 13. When the system is in an inoperative position, the front and rear brake actuators are connected to atmosphere, respectively through the atmospheric port 45 of the valve 21 and through an atmospheric port 69 associated with the brake valve 19.

Upon actuation of the brake valve, by manipulation of the control lever 20, fluid under pressure from the reservoir 12 is conducted to conduit 17, the latter supplying the rear brake actuators 11 and the chamber 26 of the valve 21 with fluid under pressure, the degree of which depends upon the pressure exerted on the lever 20. Assuming that a slight pressure is exerted upon the lever 20, and, therefore, the pressure of the fluid applied to the rear brake actuators 11 and the chamber 26 will be relatively low, the rear brakes of the vehicle will be applied a certain degree, and the diaphragm 25 will move downwardly, as viewed in the drawing. Upon such movement of the diaphragm 25, the actuating member 52 secured thereto will contact the lever 48 and cause the latter to rotate in a clockwise direction about the pivot 50. The above mentioned movement of the lever 48 will be transmitted to the lever 49 through the resilient connection constituted by the spring 58 positioned between the levers 48 and 49. It is assumed, during this phase of the operation, that the pressure of the fluid applied within chamber 26 will not exert a force of sufficient degree to overcome the precompression of the spring 58. Hence, spring 58 will move bodily without deformation. The downward force applied on lever 49 is transmitted to the valve actuating member 40a by cooperation between the lever and the abutment 55 of the aforementioned member. The latter and the hollow cylindrical member 42 secured thereto, together with the diaphragm 29, are thus caused to move downwardly against the resistance offered by the spring 46. During initial downward movement, the lower end of the hollow cylindrical member 42 contacts the ball valve 39 of the valvular member 37 and thus closes communication between the front brake chambers 10 and the atmospheric port 45. Further downward movement of the valve actuating member 40 will move the valve member 37 therewith, thus moving the ball valve 38 away from its seat to allow fluid under pressure to flow to chamber 34 and hence to the front brake actuators 10 in order to apply the front brakes to a degree substantially equal to the degree of application of the rear brakes. Fluid under pressure in chamber 34 is allowed to communicate with chamber 31 beneath the diaphragm 29, through the restricted port 47, and exert a pressure therein which moves the diaphragm 29 and the valve actuating member 40a upwardly against the downward force exerted by the pressure of the fluid applied in chamber 26. When the opposing pressures in these chambers become substantial equal, the force of the springs 46 and 40 will move the valve member 37 and the valve actuating member 40a upwardly to close the fluid pressure communication between chambers 33 and 34. Under these conditions, the valve mechanism 32 is in the so-called "lapped" position, and the brakes will remain applied until the operator either releases the pressure from the lever 20 or exerts a greater pressure thereon.

In the event that a greater degree of brake application is desired, the operating pressure is increased on the lever 20 and a corresponding increase in the degree of the pressure of the fluid supplied to the rear brake actuators occurs, thereby increasing the application of the rear brakes a corresponding degree and also increasing the pressure of the fluid supplied the front brakes in the manner heretofore described. As heretofore stated, if the increase in pressure above the diaphragm 25 is such that the pressure applied thereon is greater than the precompression of the spring 58, the forces exerted on the spring will be greater than the precompression thereof, thus causing the same to deform. When the spring 58 has deformed, the valve mechanism will thereafter be actuated through the levers 48 and 49 in cooperation with the rollers 56, 56 to produce a mechanical advantage that will maintain a proportion between the pressures of the fluid applied in the front and rear brake actuators. The mechanical advantage between the actuating force and the actuated force may be varied, to thus vary the proportion between the front and rear braking effects by movement of the rollers 56, 56 to the right or left from the position shown in the drawing. With the rollers 56, 56 adjusted to a position to give any desired ratio between the braking effects of the front and rear wheels, it will be understood that such ratio is maintained throughout the range of braking pressures admitted by the valve 19, which pressures are in excess of the above mentioned predetermined pressure.

Release of the vehicle brakes is accomplished by relieving the pressure exerted on the lever 20 to operate the brake valve 19 in such a manner as to close the communication from the reservoir 12 to conduit 17 and to connect the latter to atmosphere by way of the port 69. Chamber 26, and the rear brake actuators 11, will likewise be connected to atmosphere and the rear brakes will release through the action of the usual return springs associated therewith. Release of pressure in chamber 26 will allow the valve actuating member 40a to move upwardly to the normal position thereof, due to the pressure of the fluid beneath the diaphragm 29. In such normal position, the front brake actuators are connected with the atmosphere by way of conduits 15 and 14, chamber 34, member 42, ports 44, chamber 30 and the atmospheric port 45 in the body portion 23. Therefore, fluid under pressure, present in the front brake actuators 10, is exhausted to atmosphere and release of the front brakes is effected.

Thus, the present invention provides a novel differential braking system having means for insuring an equal degree of application of the front and rear brakes of the vehicle during the initial operation of the brake valve, as well as when a braking force is applied in the system that is below a predetermined value. Such an arrangement is desirous since, under these conditions, the front and rear brake shoes are brought into contact with their respective brake drums substantially at the same time and thus a light application of the front and rear vehicle brakes, at substantially the same time, and substantially of the same degree, is assured. It will be readily understood that, with such an arrangement, a light braking effect is obtained at all wheels of the vehicle prior to the differential action which occurs between the front and rear brakes. Hence, undue wear of the rear brakes during light brake applications is avoided. Moreover, such operation will prevent the vehicle from skidding when operating on a pavement rendered slippery due to wet weather or when operating on a roadway comprising a loose surface such as gravel, as well as assuring a smooth application of the vehicle brakes. When a low degree of brake application is desired, it is advantageous to obtain a substantially equal application of the vehicle brakes, rather than a proportion between the degree of application of the front and rear brakes, since, under these conditions, there is little or no possibility for the vehicle to swerve, and, when the pressure of the fluid applied to the system is low, it is advantageous to obtain the greatest degree of brake application available therefrom. The above advantages are secured while maintaining the desirable features of differential braking after the brake valve has been operated to admit a predetermined pressure to the system. From the foregoing description, it is also evident that means are provided by the present invention whereby the proportion between the degree of application of the front and rear vehicle brakes may be readily varied at the will of the operator.

While there has been illustrated and described only one embodiment of the present invention, it is to be understood that the same might be utilized in various fluid pressure systems. For example, instead of controlling the degree of braking effect applied at the front and rear brakes of a vehicle, the present system might be employed in a tractor-trailer fluid pressure braking system, whereby the degree of brake application of the tractor and trailer brakes would be substantially equal under certain operating conditions, and wherein the tractor brakes would be automatically controlled so that such application would be less than but proportional to the degree of application of the trailer brakes when the pressure of the fluid applied in the system is above a predetermined value. Also, in such a system, as in the system illustrated and described heretofore, such proportion could be easily varied at the will of the operator, depending upon the various conditions of driving. It will be, moreover, readily apparent that, if the rollers 56 are moved to the left of the dotted line position, as viewed in Fig. 1, the mechanical advantage between levers 48 and 49 will be such that the output of the valve is greater than but proportional to the applied pressure. Such an operation may be advantageous in certain installations. Various other changes and modifications of the device illustrated may be resorted to, as readily understood by those skilled in the art, without departing from the spirit of the invention. Reference will, therefore, be had to the appended claims for a definition of the limits of the invention.

What is claimed is:

1. A fluid braking system for automotive vehicles having front and rear brakes comprising a source of fluid pressure, actuators for the brakes, means including a brake valve for connecting said source and rear brake actuators, means including a valve for controlling the application of fluid pressure from the source to the front brake actuators, means responsive to the pressure of the fluid supplied to the rear brake actuators for operating the second named valve to supply fluid pressure from the source to the front brake actuators at substantially the same pressure throughout a predetermined range of operation of said brake valve, and means associated with said last named means for operating the second valve to transmit fluid pressure from said source to said front brake actuators at a pressure less than but proportional to the pressure supplied the rear brake actuators throughout ranges of pressure admitted to said rear brake actuators by said brake valve which exceed the maximum pressure of said predetermined range.

2. A fluid brake system for automotive vehicles having front and rear brakes comprising a source of fluid pressure, actuators for the brakes, means including a brake valve for connecting said source and rear brake actuators, means responsive to pressures of fluid supplied to the rear brake actuators up to a predetermined pressure for applying substantially the same pressures from said source to said front brake actuators, and means actuated by all pressures above said predetermined pressure supplied to the rear brake actuators for supplying fluid pressure to said front brake actuators at a pressure less than but proportional to said pressures supplied the rear brake actuators.

3. A fluid braking system for vehicles having front and rear brakes comprising a source of fluid pressure, actuators for the brakes, connections between said source and the front and rear brake actuators, means responsive to the pressure of the fluid supplied the rear brake actuators for reducing the pressure of the fluid applied to the front brake actuators, and means actuated by fluid pressure supplied said rear brake actuators at and below a predetermined pressure for rendering said first means inoperative.

4. In a fluid pressure braking system for vehicles having a pair of brake actuators, a source of fluid measure, a pair of independent connections between said source and said pairs of actuators, means including a combined relay and pressure regulating valve in one of said connections and subject to the pressure of the fluid in the other connection for admitting fluid pressure to said one connection to a degree less than but proportional to the pressure of the fluid in said other connection, and means responsive to pressures in said other connection up to and including a predetermined pressure for rendering the regulating function of said combined valve inoperative.

5. A fluid braking system for automotive vehicles having front and rear brakes comprising a source of fluid pressure, actuators for said brakes, connections between said source and actuators, a brake valve for controlling application of fluid pressure to said actuators, a reducing valve in the connection between said source and the front brake actuators for reducing the pressure of the fluid applied to said last named actuators, and means actuated by all pressures admitted by said brake valve up to and including a predetermined pressure for rendering the reducing function of said reducing valve inoperative.

6. In a fluid pressure braking system comprising a plurality of pressure responsive brake actuators, a source of fluid under pressure, means for supplying fluid under pressure from said source to one of said actuators, means responsive to the pressure of the fluid supplied to said one actuator for controlling the flow of fluid under pressure from said source to another of said actuators, means associated with the last named means for maintaining a proportion between the pressures of the fluid supplied to said actuators when the pressure of the fluid supplied to said one actuator is above a predetermined value, and means associated with said last named means for supplying fluid under pressure to said another actuator that is substantially equal to the pressure of the fluid supplied to said one actuator during initial energization of said one actuator with fluid under pressure up to said predetermined value.

7. In an apparatus for controlling the application of fluid under pressure to a plurality of pressure responsive actuators, comprising a source of fluid under pressure, means for supplying fluid under pressure from said source to one of said actuators, means responsive to the pressure applied to said one actuator for controlling the application of fluid under pressure to another of said actuators, the last named means including means for admitting fluid under pressure to said another actuator to apply the latter to a degree less than but proportional to the degree of application of said one actuator when the pressure of the fluid applied to the latter is above a predetermined value, and manually operable means associated with said last named means for varying the proportion between the fluid pressures admitted to said actuators.

8. In an apparatus for controlling the application of fluid under pressure to a plurality of pressure responsive actuators, comprising a source of fluid under pressure, means for supplying fluid under pressure from said source to one of said actuators, means responsive to the pressure applied to said one actuator for controlling the application of fluid under pressure to another of said actuators, the last named means including means for admitting fluid under pressure to said another actuator to apply the latter to a degree less than but proportional to the degree of application of said one actuator when the pressure of the fluid applied to the latter is above a predetermined value, means associated with said last named means for admitting fluid under pressure to said another actuator to apply the latter a degree substantially equal to the degree of application of said one actuator when the pressure of the fluid applied to the latter is equal to or below said predetermined value, and manually operable means cooperating with said last named means for varying the proportion between the degree of application of said actuators when the pressure of the fluid applied to said one actuator is above said predetermined value.

9. In a combined relay and pressure reducing valve comprising a casing having a valve therein adapted to control the flow of fluid under pressure, a member responsive to fluid under pressure for operating said valve, means associated with said member and said valve for obtaining a ratio between the pressure applied to said member and the pressure admitted by said valve, and means for providing an equal ratio between the aforementioned pressures when the pressure exerted upon said member is below a predetermined value.

10. In a combined relay and pressure reducing valve comprising a casing having a valve therein adapted to control the flow of fluid under pressure, a member responsive to fluid under pressure for operating said valve, means associated with said member and said valve for obtaining a ratio between the pressure of the fluid applied to said member and the pressure of the fluid admitted by said valve, said means including a pair of pivoted actuating levers, a movable connection between said levers and adapted to cooperate therewith for varying said ratio, and means associated with said levers for obtaining an equal ratio between the aforementioned pressures when the pressure exerted upon said member is below a predetermined value.

11. In a combined relay and pressure reducing valve comprising a casing having a valve therein adapted to control the flow of fluid under pressure, a member responsive to fluid under pressure for operating said valve, means associated with said member and said valve for obtaining a ratio between the pressure applied to said member and the pressure admitted by said valve, said means including a pair of pivoted actuating levers, a movable member positioned between said levers and adapted to cooperate therewith for varying said ratio, and means including a precompressed resilient connection between said levers for providing an equal ratio between the aforementioned pressures when the pressure exerted upon said member is below a predetermined value.

12. In a fluid braking system for vehicles having front and rear brakes, a source of fluid under pressure, actuators for said brakes, means for supplying fluid under pressure to said rear brake actuators including a connection between said source and said actuators and a control valve associated therewith for controlling the flow of fluid therethrough, means for supplying fluid under pressure from said source to said front brake actuators, said last named means including a separate connection between said source and said front brake actuators and having a device therein for rendering the pressure of the fluid supplied from the source to the front brake actuators less than but directly proportional to the pressure of the fluid supplied to the rear brake actuators through the range of brake application above a predetermined degree of pressure in the system, a connection between the control valve and the device for subjecting the device to the pressure of fluid supplied to the rear brake actuators, and means for rendering the pressure of the fluid supplied to the front brake actuators equal to the pressure of the fluid applied to the rear brake actuators when the pressure in the system is below said predetermined degree.

13. In a system for supplying fluid under pressure to a plurality of pressure responsive actuators, comprising a source of fluid under pressure, separate connections between said source and each of said actuators, a valve in the connection between said source and one of said actuators for supplying fluid under pressure thereto, a valve in the connection between said source and another of said actuators for controlling the flow of fluid under pressure thereto, means responsive to the pressure of the fluid applied to said one actuator for operating said last named valve, said last named valve including means for rendering the pressure of the fluid applied to said another actuator less than but proportional to the pressure of the fluid applied to said one actuator when the pressure applied to the latter is above a predetermined value, and means associated with the last named means for rendering the pressure of the fluid applied to said actuators substantially equal when the pressure applied to said one actuator is below said predetermined value.

14. In a system for supplying fluid under pressure to a plurality of pressure responsive actuators, a source of fluid pressure, separate connections between said source and each of said actuators, a valve in the connection between said source and one of said actuators for controlling the application of fluid pressure thereto, a valve in the connection between said source and another of said actuators for controlling the flow of fluid pressure thereto, means responsive to the pressure of the fluid applied to said one actuator for operating said last named valve, said last named valve including means for rendering the pressure of the fluid applied to said another actuator less than but proportional to the pressure of the fluid applied to said one actuator when the pressure applied to the latter is above a predetermined value, means associated with the last named means for rendering the pressure of the fluid applied to said actuators substantially equal when the pressure applied to said one actuator is below said predetermined value, and manually operable means for controlling said last named means whereby the proportional relationship between the pressures of the fluid applied to said actuators may be varied.

15. In a fluid pressure braking system for vehicles having front and rear brakes, actuators for said brakes, a source of fluid pressure, independent connections between said source and said front and rear brake actuators respectively, means including a combined relay and pressure regulating valve in said connection between said source and said front brake actuators, said valve subject to the pressure of the fluid in the connection between said source and the rear brake actuators for admitting fluid under pressure from said source to said front brake actuators to apply the latter to a degree less than but proportional to the degree of application of the rear brake actuators when the pressure applied to said rear brake actuators is above a predetermined value, and means for admitting fluid under pressure to said front brake actuators to apply the latter a degree substantially equal to the degree of application of said rear brake actuators when the pressure applied to said rear brake actuators is below said predetermined value.

16. In a fluid pressure braking system for vehicles having front and rear brakes, actuators for said brakes, a source of fluid pressure, independent connections between said source and said front and rear brake actuators respectively, means including a combined relay and pressure regulating valve in the connection between said source and said front brake actuators, said valve subject to the pressure of the fluid in the connection between said source and the rear brake actuators for admitting fluid under pressure from said source to said front brake actuators to apply the latter to a degree less than but proportional to the degree of application of the rear brake actuators when the pressure applied to said rear brake actuators is above a predetermined value, means for admitting the fluid under pressure to said front brake actuators to apply the latter a degree substantially equal to the degree of application of said rear brake actuators when the pressure applied to said rear brake actuators is below said predetermined value, and manually operable means associated with said combined relay and pressure regulating valve for controlling the proportion between the degrees of application of said front and rear brake actuators when the pressure of the fluid applied to said rear brake actuators is above said predetermined value.

17. In a combined relay and pressure regulating valve comprising a casing having a valve therein adapted to control the flow of fluid under pressure, a member responsive to fluid under pressure for operating said valve, means associated with said member and said valve for obtaining a proportionate ratio between the pressure of the fluid applied to said member and the pressure of the fluid admitted by said valve when the pressure applied to said member is within a predetermined range, and means for providing an equal ratio between the aforementioned pressures when the pressure exerted upon said member falls within a different pressure range.

18. In a fluid pressure braking system for vehicles having a pair of brake actuators, a source of fluid pressure, a pair of independent connections between said source and said actuators, means including a combined relay and pressure regulating valve in one of said connections and subject to the pressure of the fluid in the other connection during one range of pressures therein for admitting fluid pressure to said one connection to a degree proportional to but different from the pressure of the fluid in said other connection, and means responsive to pressures in a second range in said other connection for rendering the regulating function of said combined valve inoperative.

19. A braking system for a vehicle having two sets of brakes, a source of fluid pressure, means for conducting fluid pressure from said source to one set of brakes, means controlled by the pressure of the fluid in said first named means for conducting fluid pressure from said source to the other set of brakes at substantially the same degree of pressure, and means responsive to pressures of the fluid in said first named means in excess of the predetermined pressure for conducting fluid from said source to the other set of brakes at a decreased but proportionate degree.

ELLERY R. FITCH.